United States Patent Office 3,518,240
Patented June 30, 1970

---

3,518,240
NOVEL AMINO ACID PROTECTING GROUPS
Manohar A. Tilak and Charles S. Hollinden, Indianapolis, Ind., assignors to Eli Lilly and Company, Indianapolis, Ind., a corporation of Indiana
No Drawing. Filed Sept. 7, 1967, Ser. No. 665,987
Int. Cl. C08f *15/04;* C07c *103/52*
U.S. Cl. 260—88.2
2 Claims

ABSTRACT OF THE DISCLOSURE

Novel resin, useful as C-terminal protecting group in solid-state peptide synthesis, comprising a styrene-divinylbenzene copolymer having an ω-haloalkanoyl or an ω-hydroxyalkanoyl group attached to a phenyl group of the copolymer; allows use of benzyloxycarbonyl protecting group for the amine function.

---

Background of the invention

This invention pertains to novel substances for the protection of the carboxylic acid function of amino acids in peptide synthesis.

Since peptides are important biological substances, and their isolation from biological systems in a pure state is difficult, it is necessary to prepare these materials by synthetic chemical methods. These methods involve as a fundamental step the coupling of two or more amino acids in a manner to form an amido linkage between the molecules:

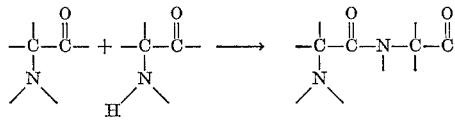

Since amino acids are at least bifunctional, it is also necessary for the chemist prior to the coupling process to render inactive all functionalities in a given amino acid which are not directly used in the coupling process. If reactive functionalities are allowed to remain, yields will be lower and purifications made difficult because of the presence of large amounts of unwanted by-products from the interaction of these functionalities. Several methods are well-known to the chemist for rendering inactive the functionalities of simple amino acids with protecting groups in such a manner that only the desired functional group is available to react when the amido linkage is formed. It is necessary for the so-called "protecting group" to be readily attached to the amino acid before amide formation and to be readily removed from the resulting peptide, after coupling, without simultaneous rupture of the newly formed amide linkage. Two types of protecting groups are necessary in peptide synthesis: the C-terminal protecting groups, those groups which render the acid portion of the amino acid inactive, as for example, alcohol derivatives, to prepare esters; amine derivatives, to prepare amides; and the like; and the N-terminal protecting groups, those groups which render the amine portion unreactive, such as benzoxycarbonyl, trityl, allyloxy, and the like. It is with the C-terminal or carboxylic acid protecting group that this invention is concerned.

Merrified, J. Am. Chem. Soc., 85,2149 (1963), has disclosed a method of "solid state" peptide synthesis wherein an amino acid which eventually will form the C-terminal amino acid of the completed peptide is reacted with a chloromethyl moiety attached to a styrene-divinylbenzene copolymer in the form of a solid resin. This reaction binds the C-terminal amino acid at the carboxylic acid function as an inactive ester, and the amine function then is free to form a peptide linkage. Esterification is effected by reaction of the triethylammonium salt of the amino acid with the benzyl halide resin in an unreactive solvent at or above ambient room temperature. The resulting amino acid-resin ester can then be reacted in a two-phase (solid-liquid) system with a solution of the N-protected amino acid which will eventually form the second fragment of the peptide molecule. This amide-forming reaction can be caused to occur by activating the carboxylic acid function of the adding amino acid, as for example by the use of dicyclohexylcarbodiimide, by conversion to the acid halide, acid anhydride, or mixed anhydride, or like methods well known to those skilled in the art. After washing off the excess reactants, the N-terminal protecting group can be removed, and the resin containing two amino acids can be subsequently reacted with a different N-protected amino acid to build up a tripeptide. Repetition of the N-protecting group removal and amidification can build up long-chain peptides in a manner well described by the prior art. As a final step, the completed peptide can be removed from the resin by contacting the peptide-resin with hydrogen bromide in glacial acetic acid.

Merrifield, Biochem., 3, 1385 (1964), used the tert.-butoxycarbonyl protecting group which allowed the N-protecting group to be removed with 1 N hydrogen chloride in acetic acid. Attempts at modification of the resin such as by nitration or bromination to allow use of the benzyloxycarbonyl N-protecting group have been largely unsuccessful. Merrifield, J. Am. Chem. Soc., 85, 2149 (1963). The N-benzyloxycarbonyl group could only be removed by treatment of the protected peptide with hydrogen bromide in acetic acid, a technique that also splits the ester bond of the C-terminal protecting group.

Summary

This invention relates to a novel group of resinous materials which by virtue of their structural characteristics allow their use in conjunction with the benzyloxycarbonyl protecting group and posses certain other unusual beneficial properties when used in solid-phase peptide synthesis. The compounds of this invention can be characterized by the formula:

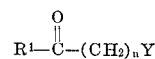

wherein:
R¹ is a resinous styrene-divinylbenzene copolymer attached at a point on a phenyl ring contained therein;
Y is OH or halo; and
n is a number between 3 and 6 inclusive.

"Halo" refers to chloro, bromo, fluoro, and iodo.
Representative substituents,

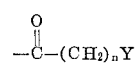

on the styrene-divinylbenzene copolymer (hereinafter) called resin) which are considered to be included within the scope of this invention can include:

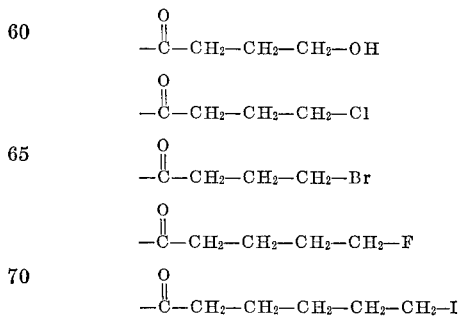

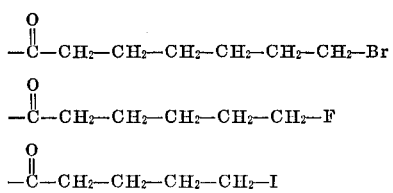

The compounds of this invention wherein Y is halogen are prepared by reacting a styrene-divinylbenzene copolymer (available commercially from Bio-Rad Laboratories, Richmond, Calif.) with the appropriate ω-haloacyl halide in the presence of a Friedel-Crafts catalyst as for example, aluminum chloride, aluminum bromide, zinc chloride, boron trifluoride, stannic chloride, or the like. The amino acid can be reacted with the resulting haloacyl resin by reacting the two substances in an inert solvent at the reflux temperature of the reaction mixture. Solvents useful for the reaction include dioxane, ethanol, isopropanol, or the like.

Alternatively, the haloacyl resin can be reacted with a mixture of tertiary amine and a low molecular weight carboxylic acid for several hours to form an ω-acyloxyacyl resin. This ester is then saponified with aqueous sodium hydroxide, potassium hydroxide, or the like to obtain the ω-hydroxy acyl resin.

Examples of tertiary amines useful in the above reaction include trimethylamine, triethylene diamine, N-ethyl piperidine, or the like.

Examples of carboxylic acids, which can be employed include formic acid, acetic acid, propionic acid, succinic acid, malonic acid, or the like.

These compounds, wherein Y is equal to OH, are reacted with the N-protected amino acid, which will become the C-terminal amino acid of the completed peptide, by reacting the two compounds in any of the above-mentioned inert solvents at or about ambient room temperature in the presence of dicyclohexylcarbodiimide or carbonyl bis-imidazole, or the like; or by activating the acid portion of the amino acid as by the formation of an acid chloride, acid anhydride, or mixed anhydride, or the like.

Rmoval of the N-protecting group and peptide formation steps are well known to those persons skilled in the art.

For example, the benzyloxycarbonyl N-protecting group which can be used in conjunction with the C-protecting groups of this invention can be removed by hydrogen bromide in acetic acid, hydrogen iodide in acetic acid, hydrogen bromide in dioxane, hydrogen bromide in chloroform, trifluoroacetic acid, or the like.

The completed peptide can be removed from the C-terminal protecting group without scission of the peptide bond by treatment with 0.05 N–2 N sodium hydroxide, 0.05 N–2 N potassium hydroxide, aqueous triethylamine, or the like in a suitable solvent or mixture of solvents which will cause swelling of the resin.

Alternatively, the peptide-resin can be reacted with ammonia to cause amidification of the C-terminal amino acid, or it can be reacted with hydrazine to yield a hydrazide which can further be reacted to form an azide useful in the preparation of additional peptide bonds on the C-terminal amino acid.

The following example will serve to further illustrate the general procedure of the preparation and use of the compounds of this invention, but is not meant to limit its scope in any manner.

EXAMPLE

A mixture of 6 g. of resin (5 percent divinylbenzene-in-styrene copolymer), and 3.216 g. (24 mM.) anhydrous aluminum chloride in 80 ml. nitrobenzene was cooled in a salt-ice bath to 5–10° C. ω-Chlorobutyryl chloride, 1.2 ml. (12 mM.), was added dropwise and the resulting mixture was stirred for 1½ hours during which time it was allowed to warm to ambient room temperature. The solvents were removed by filtration and the resin washed sequentially with 100 ml. each of acetic acid, 6 N hydrochloric acid, dioxane containing dry hydrogen chloride at a concentration equivalent to 6 N, 95 percent aqueous dioxane, dioxane, and ether.

Elemental analysis—Found: chlorine, 4.23; oxygen, 2.74.

The above resin in 100 ml. benzyl alcohol containing 10 g. of potassium acetate was heated with stirring for 16 hours at 130° C. Solvents were removed by filtration and the resulting resin was washed sequentially with 100 ml. each of 95 percent aqueous dioxane, dioxane, and ether. The resin thus obtained was identified as acetoxytrimethylenecarbonyl-resin.

This resin, in a solution of 50 ml. dioxane, 50 ml. ethanol, 15 ml. water, and 10 ml. 2 N sodium hydroxide, was shaken for 5 hours at ambient room temperature. The solvents were removed by filtration and the resulting solid was washed in the same manner as described above. The resulting product was hydroxytrimethylenecarbonyl-resin.

Elemental analysis—Found: chlorine, 0.00; oxygen, 4.34.

N - benzyloxycarbonyl-L-phenylalanine (1.495 g., 5 mM.) was dissolved in 50 ml. of methylene chloride and treated with stirring at room temperature with 5.25 mM. (0.850 g.) carbonyl bis-imidazole. The resulting mixture was stirred at ambient room temperature for one-half hour, then 5 g. of the above resin were added. The resulting mixture was stirred for 46 hours, filtered, and washed sequentially with 100 ml. each of methylene chloride, ethanol, and methylene chloride.

Amino acid analysis—Found: Phe. 0.224 μM/mg.

The benzyloxycarbonyl group was removed by suspending the solid in 30 ml. of 30 percent hydrogen bromide in glacial acetic acid for 30 minutes at room temperature, then decanting therefrom the solvents and washing with 100 ml. each of acetic acid and then methylene chloride to yield L-phenylalanine-resin hydrobromide. The free-base was prepared therefrom by neutralizing the salt with excess triethylamine in methylene chloride, filtering, and washing the resulting solid with 100 ml. of methylene chloride.

We claim:

1. A compound of the formula $$R^1-\overset{O}{\underset{\|}{C}}-(CH_2)_nY$$

wherein:

$R^1$ is a resinous styrene-divinylbenzene copolymer attached at a point on a phenyl ring contained therein (resin);

$n$ is a number between 3 and 6 inclusive; and

Y is OH or halo.

2. A compound as in claim 1 said compound being an ω-chlorobutyryl resin derivative of a styrene-divinylbenzene copolymer.

References Cited

Tilak, M. A. and Hollinden, C. S.: Solid Phase Synthesis of Some Insulin Peptide Fragments, Peptides 1968, ed. by E. Bricas, John Wiley & Sons, Publ. New York.

Schreiber, J.: Ester Formation by Hydroxymethylpolystyrene with N-protected Amino Acids and Peptides, Peptides, ed. by Beyerman, H. C., 1967, John Wiley & Sons.

JOSEPH L. SCHOFER, Primary Examiner

R. S. BENJAMIN, Assistant Examiner

U.S. Cl.X.R.

260—112.5